United States Patent [19]

Chau et al.

[11] Patent Number: 4,983,291

[45] Date of Patent: Jan. 8, 1991

[54] DRY HIGH FLUX SEMIPERMEABLE MEMBRANES

[75] Inventors: Michael M. Chau; William G. Light; Hong C. Chu, all of San Diego, Calif.

[73] Assignee: Allied-Signal Inc., Morris Township, Morris County, N.J.

[21] Appl. No.: 450,637

[22] Filed: Dec. 14, 1989

[51] Int. Cl.$^5$ ............... B01D 61/02; B01D 71/60; B01D 71/68

[52] U.S. Cl. ............... 210/490; 210/500.37; 210/500.41; 427/245; 427/337

[58] Field of Search ............... 210/490, 500.37, 500.41, 210/500.42; 427/244, 245, 340, 342

[56] References Cited

U.S. PATENT DOCUMENTS

| | | | |
|---|---|---|---|
| 3,744,642 | 7/1973 | Scala et al. | 210/500 |
| 4,259,183 | 3/1981 | Cadotte | 210/500.37 X |
| 4,277,344 | 7/1981 | Cadotte | 210/654 |
| 4,520,044 | 5/1985 | Sundet | 210/500.41 X |
| 4,606,943 | 8/1986 | Rak et al. | 210/500.37 X |
| 4,609,468 | 9/1986 | Cramm | 210/490 |
| 4,619,767 | 10/1986 | Kamiyama et al. | 210/490 |
| 4,747,953 | 5/1988 | Zupancic et al. | 210/490 X |
| 4,828,708 | 5/1989 | Bray | 210/490 X |
| 4,830,885 | 5/1989 | Tran et al. | 427/245 |
| 4,851,127 | 7/1989 | Lee et al. | 210/490 X |
| 4,885,091 | 12/1989 | Swedo et al. | 210/500.37 |
| 4,919,808 | 4/1990 | Swedo et al. | 210/490 |

Primary Examiner—Robert Spitzer
Attorney, Agent, or Firm—Raymond H. Nelson; Harold N. Wells; Gerard P. Rooney

[57] ABSTRACT

High flux semipermeable membranes which comprises the polymerized reaction product within and/or on a porous support backing material may be prepared by contacting the porous support such as a polysulfone with an aqueous solution of a polyamine which may, if so desired, contain a polar aprotic solvent not reactive with the amines, a polyhydric compound and an acid acceptor. The surface of the coated support is freed of excess solution and thereafter contacted with an organic solution of a polyacyl halide for a period of time sufficient to form a polymerized reaction product within and/or on the support material. The resulting composite is then treated with a hydroxy polycarboxylic acid, polyaminoalkylene polycarboxylic acid, sulfonic acid, amine salts of acids, amino acid, amino acid salt, polymeric acid and inorganic acid, before drying of the membrane. This will enable the membrane to be stored in a dry manner prior to use thereof in a separation process. The resultant membrane composite may be used in separation processes such as desalination of brackish or sea water or the softening of domestic hard water.

32 Claims, No Drawings

DRY HIGH FLUX SEMIPERMEABLE MEMBRANES

BACKGROUND OF THE INVENTION

The separation of various components found in liquids or gases may be effected in a multitude of processes, the techniques for effecting the separation utilizing asymmetric or composite membranes including selective permeation, ultrafiltration or reverse osmosis. A particular example of the latter type of separation involves a desalination process in which water is rendered potable or suitable for other purposes having been obtained from sea water, contaminated water, brackish water or brine. This process is of especial value in areas of the world where the water found in the area is brackish or is saline in nature. The desalination of this water is necessary in order to provide large amounts of potable or relatively nonsalty water for industrial, agricultural or home use. The desalination of the water is effected by forcing the water through a reverse osmosis membrane whereby the purified water is passed through the membrane and recovered, while the contaminants or salts do not pass through the membrane, thus, in effect, being rejected by the membrane and recovered as the retentate.

A reverse osmosis membrane, in order to be utilized for such a purpose, must possess certain characteristics applicable to the process. For example, the membrane must have a very high salt rejection coefficient. In addition, another important characteristic and a problem which must be addressed when utilizing the membrane, is the ability of the membrane to be tolerant to chlorine attack. Another important factor which is present in the use of a reverse osmosis membrane is that said membrane also possesses a high flux characteristic, that is, the ability to pass a relatively large amount of water through the membrane at relatively low pressures. If a membrane possesses these desirable characteristics, it will be commercially feasible in its applicability to the desalination process.

Reverse osmosis membranes have been prepared and used from a wide variety of known polymeric materials. While many of these polymeric materials possess the ability of reducing the concentration of a solute to where the rejection capability is in excess of 98%, some do not possess the necessary flux whereby the volume of water which is required to be produced by the membrane per unit of membrane surface per unit time is sufficient for the application of the technology.

Inasmuch as the semipermeable membrane which is used for the desalination process should be relatively thin in nature in order to provide a desirable flux, it is necessary, in many instances, that the reverse osmosis membrane be composited or laminated on a porous support backing material. This porous support backing material should in itself possess certain characteristics which make it desirable for such a use. For example, the porous support material should possess pore sizes which are sufficiently large enough so that the water or permeate can pass through the support without affecting or lessening the flux of the entire composite. Conversely speaking, the pore size should not be so large that the thin composite semipermeable membrane will tend to fill up or penetrate too far into the pores, thus distorting the shape of the thin film membrane with the attendant possibility of rupturing the membrane when operated under high pressure, thus causing said membrane to lose its effectiveness in the reverse osmosis process.

Many U.S. patents describe various membranes which are useful in desalination processes, see for example, those cited and discussed in U.S. Pat. No. 4,830,885. One of the earliest patents to describe membranes of the type used in the present invention is U.S. Pat. No. 3,744,642 to Scala et al. Scala et al. suggest reacting a broad group of amines or bisphenols with acyl halides or sulfonyl halides on a support material to form thin membranes. This provides strength to the composite.

U.S. Pat. No. 4,277,344 discloses a reverse osmosis membrane made in situ according to Scala et al., which has been prepared from a polyacyl halide and an arylene polyamine. The U.S. Pat. No. '344 teaches that the membrane contains a plurality of sites having the formula:

$$Ar(CON-)_2COOH$$

in which Ar represents the aromatic nucleus residue of the polyfunctional aryl halide. It is of interest that according to the U.S. Pat. No. '344, solvents for the polyacyl halides that dissolve or plasticize the support material should not be used. In accord is U.S. Pat. No. 4,619,767 to Kamiyama et al. which states that it is necessary to avoid solvents for the crosslinking agents (e.g. acid halides) which dissolve or swell the porous substrate.

In U.S. Pat. No. 4,830,885 an improved supported membrane is disclosed in which a polyhydric compound (which does not dissolve typical support materials), is included with the amine solution in preparation of the membrane. The polyhydric compound provides improved flux through the membrane while maintaining the high rejection of the dissolved salts.

The high flux semipermeable membranes are sensitive in nature and require delicate and complex handling in order to avoid a rupture of the thin film, thus rendering the membrane inoperable. Usually the membrane must be maintained in a wet state in order to maintain the integrity of the film. For example, previously cited U.S. Pat. No. 3,744,642 states that the membrane is stored in a high humidity atmosphere or water so that the membrane does not dry out, while U.S. Pat. No. 4,830,885 teaches that the membrane is either kept wet or is treated with a polyhydric compound such as glycerine in order to protect the thin film membrane from drying out which would lead to a loss of performance of the membrane when used in a separation process. Commercial membranes usually can not be dried at room temperature or elevated temperatures (which may be defined as a weight loss less than about 2% after heating at a temperature of 110° C. for a period of 1 hour) without imposing a deleterious effect upon the flux and rejection rate of the membrane. In order to facilitate a less complicated procedure for handling the membranes it is essential to have dry membranes which are less susceptible to damage due to the handling of the membrane, render the membrane easier for heat sealing, have less salt passage in elemental construction and possibly require no sterilization. As will hereinafter be shown in greater detail it has now been discovered that membranes which are formed according to the process hereinafter set forth in greater detail may be subjected to treatment with certain types of acids to form a membrane which may be dried and thereafter, when in use as a separation membrane, still maintain a high flux with a concurrent high rejection rate.

SUMMARY OF THE INVENTION

This invention relates to high flux semipermeable membranes comprising a permselective barrier composited on a porous support backing material. More specifically the invention is concerned with membranes which will exhibit an extensive tolerance to chlorine and oxidant degradation, a superior degree of solvent permeation rate and a superior degree of solute rejection.

In general, the particular membranes which constitute the inventive feature of the present invention will comprise the reaction product resulting from the reaction of polyacyl halides, polysulfonyl halides or polyisocyanates with polyamines or bisphenols. The reaction product is deposited within and/or on a porous support backing material. After treatment of this membrane in a process hereinafter described in greater detail the resulting membrane may be utilized to treat a water source over a relatively long period of time without replacement of the membrane, the long life of the membrane being, in part, due to the tolerance to degradation resulting from exposure to chlorine or other oxidizing agents which are present in the water source.

It is therefore an object of this invention to provide a composite membrane which is suitable for use in separation processes, said membrane possessing desirable characteristics.

A further object of this invention is to provide a process for preparing a semipermeable membrane which is tolerant to chlorine and other oxidizing agents, said membrane being in a state adapted for ease in handling without inflicting any irreversible damage to the membrane with respect to flux and solute rejection.

In one aspect an embodiment of this invention resides in a high flux semipermeable membrane prepared by coating a porous support backing material with an aqueous solution of a polyamine, removing excess solution, contacting the coated porous support backing material with an organic solvent solution of a polyacyl halide, polysulfonyl halide or polyisocyanate to form a reaction product within and/or on the surface of said porous support backing material, treating the resultant composite with a solution of an acid or amine salt selected from the group consisting of hydroxypolycarboxylic acids, polyaminoalkylene polycarboxylic acids, sulfonic acids, amino acids, amino acid salts, amino salts of acids, polymeric acids and inorganic acids, drying and recovering the resultant high flux semipermeable membrane.

Another embodiment of this invention is found in a process for the preparation of a high flux semipermeable membrane which comprises coating a porous support backing material with an aqueous solution of an aromatic polyamine, removing excess solution, contacting the coated porous support backing material with an organic solvent solution of a polyacyl halide, polysulfonyl halide, or polyisocyanate to form a reaction product within and/or on the surface of said porous support backing material, treating resultant composite with a solution of an acid or amine salt selected from the group consisting of hydroxypolycarboxylic acids, polyaminoalkylene polycarboxylic acids, sulfonic acids, amine salts of acids, amino acids, amino acid salts, polymeric acids and inorganic acids, drying and recovering the resultant high flux semipermeable membrane.

A specific embodiment of this invention is found in a high flux semipermeable membrane which is prepared by coating polysulfone with an aqueous solution of m-phenylene diamine, removing excess solution, drying the surface of the coated polysulfone to the touch, contacting the coated polysulfone with a naphtha solution of trimesoyl chloride to form a reaction product within and/or on the surface of said polysulfone, treating the resultant composite with a solution of citric acid, drying and recovering the resultant high flux semipermeable membrane.

Another specific embodiment of this invention is found in a process for the preparation of a high flux semipermeable membrane which comprises coating polysulfone with an aqueous solution of m-phenylene diamine, said aqueous solution containing ethylene glycol or N-methylpyrrolidone, removing excess solution and drying the coated polysulfone, contacting the coated polysulfone with a naphtha solution of trimesoyl chloride to form a reaction product within and/or on the surface of said porous support backing material, treating the resultant composite with a solution of citric acid, drying and recovering the resultant high flux semipermeable membrane.

Other objects and embodiments will be found in the following detailed description of the invention.

DETAILED DESCRIPTION OF THE INVENTION

As hereinbefore set forth, the present invention is concerned with high flux semipermeable membranes which are tolerant to chlorine and other oxidants and to a method for preparing these membranes whereby they may be handled prior to installation in a reverse osmosis apparatus with relative ease and without the possibility of damage to the membranes. As was previously discussed, membranes heretofore were usually maintained in a hydrated condition to facilitate the handling of the membranes with a concurrent minimization of affecting damage to the membrane. It has now been discovered that by treating a thin film composite membrane comprising a reaction product resulting from the reaction between a polyamine or bisphenol with a polyacyl halide, polysulfonyl halide or polyisocyanate composited on or into a porous support backing material with a solution of an acid or amine salt in which the pH of the solution is less than about 7.0 of the type hereinafter set forth in greater detail it is possible to subsequently subject the membrane to drying and thereafter handling the membrane in a dry condition without damaging the membrane prior to use thereof.

The membranes are generally prepared by the method set forth in U.S. Pat. No. 3,744,642. This method entails coating an aqueous solution of a polyamine or a bisphenol, and preferably a polyamine, on a porous support backing material and removing the excess solution by rolling, spunging, air knifing, or other suitable techniques. Thereafter, the surface of the coated support material is freed of excess amine solution and is then contacted with an organic solution of a polyacyl halide, polysulfonyl halide or polyisocyanate, and preferred compound comprising a polyacyl halide. Inasmuch as the surface of the coated porous support backing material is free of excess solution the polymerized condensation product resulting from the reaction between the two materials is formed within and/or on the porous support. Thereafter the resulting composite is treated in a manner hereinafter set forth in greater detail with a solution of an acid.

The porous support backing material comprises a polymeric material containing pore sizes which are of sufficient size to permit the passage of permeate therethrough, but are not large enough so as to interfere with the bridging over of the resulting ultrathin reverse osmosis membrane. In the preferred embodiment of the invention, the pore size of the porous support backing material will range from about 1 to about 5,000 millimicrons inasmuch as pores which are larger in diameter than 5,000 millimicrons will permit the ultrathin reverse osmosis membrane to sag into the pore, thus disrupting the flat sheet configuration which is a desirable characteristic of the membrane. Examples of porous support backing materials which may be used to prepare the desired membrane composite of the present invention will include such polymers as polysulfone, polycarbonate, microporous polypropylene, the various polyamides, polyimines, polyphenylene ether, various halogenated polymers such as polyvinylidine fluoride, etc.

The porous support backing material may be coated utilizing either a hand coating or continuous operation with an aqueous solution of monomeric polyamines or to render the resulting membrane more resistant to environmental attacks of monomeric secondary polyamines. These monomeric polyamines may comprise cyclic polyamines such as piperazine, etc.; substituted cyclic polyamines such as methyl piperazine, dimethyl piperazine, etc.; aromatic polyamines such as m-phenylenediamine, o-phenylenediamine, p-phenylenediamine, etc.; substituted aromatic polyamines such as chlorophenylenediamine, N,N'-dimethyl-1,3-phenylenediamine, etc.; multi-aromatic ring polyamines such as benzidine, etc.; substituted multi-aromatic ring polyamines such as 3,3'-dimethylbenzidene, 3,3'-dichlorobenzidine, etc.; or a mixture thereof depending on the separation requirements as well as the environmental stability requirements of the resulting membranes. The solution which is utilized as the carrier for the aromatic polyamine will comprise water in which the aromatic polyamine will be present in the solution in an amount in the range of from about 0.1 to about 20% by weight of the solution and which will have a pH in the range of from about 8 to about 14. The pH is afforded by the presence of a basic acid acceptor which is present in an amount ranging from about 5 to about 1000 parts per million. Some examples of these acceptors will include sodium hydroxide, potassium hydroxide, sodium carbonate, triethylamine, N,N'-dimethylpiperazine, etc.

After coating the porous support backing material with the aqueous solution of the aromatic polyamine, the excess solution is removed by suitable techniques previously discussed and the surface of the coated support is free of excess solution. While the treated surface is not wet to the touch, additional moisture may be present inasmuch as oven baking of such supports will produce a weight loss. Following this, the coated support material is then contacted with an organic solvent solution of the aromatic polyacyl halide. Examples of aromatic polyacyl halides which may be employed will include di- or tricarboxylic acid halides such as trimesoyl chloride (1,3,5-benzene tricarboxylic acid chloride), isophthaloyl chloride, terephthaloyl chloride, trimesoyl bromide (1,3,5-benzene tricarboxylic acid bromide), isophthaloyl bromide, terephthaloyl bromide, trimesoyl iodide (1,3,5-benzene tricarboxylic acid iodide), isophthaloyl iodide, terephthaloyl iodide, as well as mixtures of di-tri, tri-tri carboxylic acid halides, that is, trimesoyl halide and the isomeric phthaloyl halides. The polyacyl halides may be substituted to render them more resistant to further environmental attack. Again, in the preferred embodiment of the invention, the aromatic polyacyl halide is present in the organic solvent solution in a range of from about 0.01 to about 5% by weight of the solution. The organic solvents which are employed in the process of this invention will comprise those which are immiscible with water, immiscible or sparingly miscible with polyhydric compounds and may comprise paraffins such as n-pentane, n-hexane, n-heptane, cyclopentane, cyclohexane, methylcyclopentane, naphtha, etc. or halogenated hydrocarbon such as the Freon series or class of halogenated solvents.

It is also contemplated within the scope of this invention that the aqueous solution of the polyamines may also contain other components therein. For example, the aqueous solution may also include polyhydric components such as ethylene glycol, propylene glycol, glycerin, other longer carbon atom backbone glycols, i.e., ($C_4$–$C_{12}$), polyethylene glycol, polypropylene glycol, copolymers of ethylene glycol and propylene glycol, etc. used singly or mixed with each other. The polyhydric compound may be present in the aqueous solution in amounts ranging from about 0.1 to about 50%. Another component which may also be present in the aqueous solution comprises a polar aprotic solvent for the porous support, said solvent being present in an amount ranging from about 0.01 to about 75% by weight and preferably from about 0.1 to about 20% by weight. Such solvents which do not react with the amines and which will enhance the rate of transfer of water through the membrane will be selected from at least one member of the group consisting of N-methyl pyrrolidone, 2-pyrrolidones, N,N-dimethylformamide, dioxane, pyridine, lutidines, picolines, tetrahydrofuran, sulfolane, sulfolene, hexamethylphosphoramide, triethylphosphite, N,N-dimethylacetamide, acetonitrile, and N,N-dimethylpropionamide.

Inasmuch as the support surface coated with the polyamine is free of excess solution before contact with the organic solution, the polymerization of the two components of the membrane will occur within and/or on the surface of the support. The addition of a solvent for the backing material may affect the membrane forming reaction since such solvents will be generally somewhat miscible in the organic phase. The contact time used for the formation of the thin film membrane will vary over a relatively wide range of from about 0.1 second to about 60 seconds, but the reaction is believed to occur in less than one second.

If so desired, prior to the acid treatment the composite of chlorine-tolerant membrane may be subjected to a wash utilizing water as the substrate which may contain $Na_2CO_3$ or $NaHSO_3$ for extraction purposes which is effected at room temperature or an elevated temperature for a period of time in the range of from about 0.1 to about 60 minutes. Following the formation of the thin film composite on the porous support backing material, the membrane is then subjected to treatment with an acid selected from the group consisting of hydroxypolycarboxylic acids, polyaminoalkylene polycarboxylic acids, sulfonic acids, amino acids, amino acid salts, amine salts of acids, polymeric acids and inorganic acids, whereby the membrane may be handled in a dry condition rather than maintaining said membrane in a moistened condition. The treatment with the acid may be affected directly after recovering the membrane from the organic solvent solution or the membrane may be treated to remove the excess organic solution and washed. Examples of the acids which are employed in the treatment step will include citric acid, ascorbic acid, tartaric acid, ethylenediaminetetraacetic acid, propylenediaminetetraacetic acid, ethylenetriaminetriacetic acid, ethylenetetraaminediacetic acid, propylenetriaminetriacetic acid, sulfamic acid, sulfonic acid, p-toluene sulfonic acid, m-toluene sulfonic acid, glycine, alanine, valine, leucine, isoleucine, serine, lysine, L-lysine hydrochloride, polymaleic acid, polyacrylic acid, m-phenylene diamine salt of acetic acid, hydrochloric acid, etc. The aforementioned acids will be present in the treating solution which is maintained at a pH of less than 7.0 in a range of from about 0.1% to about 20% by weight while exposing the membrane to the acid for a period of time ranging from about 1 second to about 24 hours. The acid treatment of the membrane is usually affected at temperatures ranging from ambient up to about 90° C. or more and preferably at a temperature in the range of from about 20° to about 40° C.

Following the treatment of the membrane with the acid the membrane may be rinsed briefly with water to remove the excess acid before being dried at room temperature or in an oven at a temperature up to about 170° C. for a period of time ranging from about 1 minute to about 2 hours or more in duration.

Also if so desired after the acid treatment and drying, the membrane may be subjected to an optional step wherein the membrane is coated with protective coating to avoid damaging the membrane during handling thereof.

The high flux chlorine tolerant semipermeable membranes may be prepared in a continuous manner of operation. When this type of operation is employed, a porous support backing material is continuously passed through a bath of the aqueous solution of the polyamine or bisphenol which optionally may contain a polar aprotic solvent, a polyhydric material as well as an acid acceptor or combinations thereof. After passage through the bath the coated backing material is continuously withdrawn and any excess solution is removed by a suitable technique familiar to those skilled in the art. A surface of the coated support is free of excess solution to the touch according to the methods previously set forth and is then continuously passed through the organic solvent solution of the polyacyl halide, polysulfonyl halide or polyisocyanate. Formation of the thin film composite membrane on only the solution free face of the surface is preferred and thus, only one surface of the support will be contacted with the organic solution. The polymerizing reaction will begin while the organic solution is in contact with the amine coating, following which the composite comprising the polymerized reaction product in the form of a thin film semipermeable membrane within and/or on the surface of the porous support backing material will be optionally washed and contacted with an aqueous solution of a hydroxy polycarboxylic acid or polyaminoalkylene polycarboxylic acid, amino sulfonic acid and others for a predetermined period of time. Following this the thin film composite membrane may then be optionally rinsed and dried either at ambient temperature or an elevated temperature and recovered. Thereafter, the optional protective coating may be applied.

The resultant high flux chlorine tolerant semipermeable membrane may then be stored in a dried condition until ready for use without the danger of inflicting damage to the membrane such as tearing, etc., whereby the efficiency of the membrane in a subsequent separation process will be lowered or lost. The desired membrane may be employed for any separation process desired such as the desalination of sea water or brackish water, other treatments of water such as the softening of hard water whereby salts are removed, boiler water treatment, concentration of whey or fruit juices, etc. The membranes which are in the form of flat sheets are particularly applicable for use in modules either in single sheet or multiple sheet units wherein the sheet or sheets are wound in a spiral type configuration.

The following examples are given for purposes of illustrating the high flux semipermeable membranes which have been prepared according to the process hereinbefore set forth and to the use thereof as separation agents. However, it is to be understood that these examples are provided merely for the purpose of illustration and that the present invention is not necessarily limited thereto.

EXAMPLE 1

A thin film composite reverse osmosis membrane was prepared by passing a fabric supported porous polysulfone through an aqueous solution containing 3.5% by weight of m-phenylenediamine (MPDA), followed by removing all excess solution on the film side. The film side of the polysulfone was contacted with a naphtha solution containing 0.14% trimesoyl chloride. Following this samples of the membrane were treated with a 1% solution of acids comprising citric acid, ascorbic acid, sulfamic acid, tartaric acid, hydrochloric acid, and ethylenediaminetetraacetic acid. The treatment was affected by soaking the membrane in the acid solutions containing 1% by weight of the acid for a period of 15 minutes at room temperature. Following this the membranes were rinsed with deionized water for 1 minute to remove excess acid. Thereafter the membranes were dried in an oven at 100° C. for a period of 15 minutes.

EXAMPLE 2

The membranes prepared according to Example 1 above were tested by placing each sample in a stainless steel flat cell and passing a synthetic brackish water feed containing 2 g/liter of sodium chloride across the surface of a 25×76 mm membrane at a feed rate of 4.27 liters/minute. The tests were carried out at a pressure of 1520 kPa (220 psig) on one side of the membrane while the other side is maintained at atmospheric pressure. A temperature of 24° C. was maintained with a pH of 7.5. The permeate was measured and the rejection of sodium chloride and the flux determined. The results are set forth in Table 1 below.

TABLE 1

| Membrane | Acid Treatment[a] | Flux (gfd) | % Rejection |
|---|---|---|---|
| A[b] | None | 30.5 | 98.1 |
| B | Water | 4.4 | 94.4 |
| C | 1% HCl | 21.4 | 95.6 |
| D[c] | 1% Citric acid | 23.0 | 98.0 |
| D | 1% citric acid | 20.4 | 97.8 |
| E | 1% Ascorbic acid | 14.4 | 98.5 |
| F | 1% Sulfamic acid | 14.0 | 98.5 |
| G | 1% EDTA | 12.3 | 98.2 |
| H | 1% Tartaric acid | 9.5 | 93.6 |

[a]Followed by 1 minute water rinse
[b]No drying
[c]No rinsing

EXAMPLE 3

A thin film composite membrane which was prepared in a manner similar to that set forth in Example 1 above was treated with various concentrations of citric acid for a period of 5 minutes, followed by drying in an oven at 100° C. for a period of 15 minutes. The membranes were then used in a test similar to that described in Example 2 above. The results of this test are set forth in Table 2 below.

TABLE 2

| Membrane | Acid Treatment | Flux (gfd) | % Rejection |
| --- | --- | --- | --- |
| A | None | 30.6 | 98.1 |
| B | water | 4.4 | 94.4 |
| D-1 | 1% Citric acid | 24.5 | 97.8 |
| D-2 | 2% Citric acid | 45.7 | 97.9 |
| D-3 | 5% Citric acid | 66.7 | 96.5 |
| D-4 | 10% Citric acid | 58.4 | 94.2 |

EXAMPLE 4

A thin film reverse osmosis membrane was prepared by passing a porous polysulfone film backed by a fabric support through an aqueous solution containing 2.4% by weight of m-phenylenediamine, 20% by weight of N-methylpyrrolidone and 0.01% sodium carbonate. After drying to the touch the coated support was passed through a naphtha solution containing 0.10% trimesoyl chloride. Following this one sample of the membrane was contacted with an aqueous solution containing 2% citric acid and another sample was contacted with an aqueous solution containing 5% citric acid. The two samples which were contacted with the acid were dried in an oven at a temperature of 100° C. for a period of 15 minutes. Thereafter the two samples as well as the third sample which was not treated with the acid were utilized in a test similar to that described in Example 2 above except that the pressure utilized for the test was 525 kPa (75 psig). The results of this test are set forth in Table 3 below.

TABLE 3

| Membrane | Acid Treatment | Drying | gfd | % Rejection |
| --- | --- | --- | --- | --- |
| M | None | No | 12.9 | 89.2 |
| N | 2% Citric Acid | Yes | 18.1 | 91.4 |
| O | 5% Citric Acid | Yes | 32.4 | 87.9 |

It is to be noted from the above examples that the membranes which were treated with an acid subsequent to membrane formation thereof and dried at an elevated temperature exhibited excellent flux and rejection characteristics. As a matter of fact, after drying such membranes had higher flux at essentially the same rejection as the wet membrane. This was totally unexpected in view of known teachings, as confirmed by Membrane B, which held that membranes must be maintained in a wet state prior to use thereof to prevent any damage occurring to the membrane which would affect the performance thereof.

EXAMPLE 5

A thin film composite reverse osmosis membrane was prepared by passing a fabric supported porous polysulfone through an aqueous solution containing 3.0% by weight of MPDA. Any excess solution was removed. Thereafter the polysulfone side was passed through a naphtha solution of trimesoyl chloride (0.18% by weight). After optional washing of the membrane with sodium carbonate and sodium bisulfite solutions the membranes were treated respectively with 1% (by weight) of aqueous solutions of p-toluenesulfonic acid (PTSA), L-lysine hydrochloride, glycine and MPDA for five minutes. The membranes were drained at room temperature for ten minutes before drying at 170° C. for 2 minutes in an oven. The membranes were subjected to a test similar to that set forth in Example 2.

The performance of these membranes are summarized in Table 4 below.

TABLE 4

| Treatment (1%/ 5 minutes) | Drying Schedule | pH | Flux (gfd) | % rejection | % wt. loss (110° C./ 1 hr.) |
| --- | --- | --- | --- | --- | --- |
| None | None | — | 26.1 | 98.3 | — |
| PTSA | RT/10 min. 170° C./2 min. | 1.90 | 38.6 | 98.2 | 0.28 |
| L-lysine Hydrochloride | RT/10 min. 170° C./2 min. | 5.60 | 25.9 | 98.2 | 0 |
| Glycine | RT/10 min. 170° C./2 min. | 6.15 | 21.5 | 98.6 | 0.57 |
| MPDA | RT/10 min. 170° C./2 min. | 7.75 | 7.6 | 94.7 | 0.48 |

EXAMPLE 6

A thin film composite reverse osmosis membrane was prepared by passing a polysulfone porous support film through an aqueous amine solution containing 2.9% MPDA, any excess amine solution was removed before passing through a trough containing a solution of 0.17% trimesoyl chloride. Thereafter the membrane was rinsed with RO permeate water. Samples of this membrane were treated with acetic acid and MPDA salts of acetic acid. The resulting membranes were tested in a manner set forth in Example 2 above. The results, as shown in Table 5, indicated good performance with the amine salts.

TABLE 5

| Treatment (1%/2') | Drying Schedule | pH | Flux (gfd) | % rejection | % wt. loss (110° C./ 1 hr.) |
| --- | --- | --- | --- | --- | --- |
| None | None | — | 24.5 | 98.2 | — |
| Acetic acid | RT/10' + 170° C./2' | 2.5 | 7.8 | 96.6 | 2.5 |
| Acetic acid + 0.5 eq MPDA | RT/10' + 170° C./2' | 3.8 | 12.6 | 97.6 | 2.7 |
| Acetic acid + 1.0 eq MPDA | RT/10' + 170° C./2' | 4.2 | 15.5 | 97.0 | 2.4 |

EXAMPLE 7

A thin film composite reverse osmosis membrane is prepared as described in Example 5 above. The membrane is soaked respectively in 2% (by weight) of aqueous solutions of polymaleic acid, polyacrylic acid, partially neutralized polymaleic, and polyacrylic acids. Thereafter these membranes are drained for ten minutes at room temperature before drying at 160° C. for 3.5 minutes. While the control (sample dried without any treatment) would show a loss of its flux and rejection, the membranes treated with the polymeric acids and partially neutralized polymeric acids would retain their flux and rejection.

We claim as our invention:
1. A high flux semipermeable membrane prepared by coating a porous support backing material with an aqueous solution of a polyamine, removing excess solution, contacting the coated porous support backing material with an organic solvent solution of a polyacyl halide, polysulfonyl halide or polyisocyanate to form a condensation reaction product within and/or on the surface of said porous support backing material, treating the resultant composite with a solution of an acid selected from the group consisting of hydroxypolycarboxylic acids, polyaminoalkylene polycarboxylic acids, sulfonic acids, amine salts of acids, amino acids, amino acid salts, polymeric acids and inorganic acids, drying and recovering the resultant high flux semipermeable membrane.

2. The high flux membrane as set forth in claim 1 further characterized in that the surfaces of said coated porous support backing material are freed of excess solution before contacting one of said surfaces with said organic solvent solution.

3. A high flux semipermeable membrane as set forth in claim 1 in which the acid solution is maintained at a pH less than about 7.0.

4. The high flux membrane as set forth in claim 1 in which said polyamine is an aromatic polyamine.

5. The high flux membrane as set forth in claim 4 in which said aromatic polyamine is m-phenylenediamine.

6. The high flux membrane as set forth in claim 4 in which said aromatic amine is o-phenylene.diamine.

7. The high flux membrane as set forth in claim 4 in which said aromatic amine is 5-chlorophenylenediamine.

8. The high flux membrane as set forth in claim 1 in which said polyacyl halide is an aromatic polycarboxylic acid halide.

9. The high flux membrane is set forth in claim 8 in which said aromatic polycarboxylic acid halide is trimesoyl chloride.

10. The high flux membrane as set forth in claim 1 further characterized in that said aqueous solution contains a polar aprotic solvent selected from the group consisting of N-methylpyrrolidone, 2-pyrrolidones, N,N-dimethylformamide, dioxane, pyridine, lutidines, picolines, tetrahydrofuran, sulfolane, sulfolene, hexamethylphosphoramide, triethylphosphite, N,N-dimethylacetamide, acetonitrile, and N,N-dimethylpropionamide.

11. The high flux membrane as set forth in claim 10 in which said polar aprotic solvent is present in said aqueous solution in a concentration in the range of from about 0.01% to about 75% by weight.

12. The high flux membrane as set forth in claim 1 further characterized in that said aqueous solution contains a polyhydric compound selected from the group consisting of ethylene glycol, propylene glycol, glycerine, polyethylene glycol, polypropylene glycol, backbone glycols having from 4 to 12 carbon atoms and mixtures thereof.

13. The high flux membrane as set forth in claim 1 in which said acid is present in said solution in a concentration in the range of from about 0.5% to about 20% by weight.

14. The high flux membrane as set forth in claim 13 in which said acid is citric acid.

15. The high flux membrane as set forth in claim 13 in which said acid is tartaric acid.

16. The high flux membrane as set forth in claim 13 in which said acid is ethylenediamine tetraacetic acid.

17. The high flux membrane as set forth in claim 13 in which said acid is p-toluene sulfonic acid.

18. The high flux membrane as set forth in claim 13 in which said acid is sulfamic acid.

19. The high flux membrane as set forth in claim 13 in which said acid is amine salts of acids.

20. The high flux membrane as set forth in claim 13 in which said acid is polymaleic acid.

21. The high flux membrane as set forth in claim 13 in which said acid is hydrochloric acid.

22. The high flux membrane as set forth in claim 13 in which said acid is L-lysine hydrochloride.

23. The high flux membrane as set forth in claim 13 in which said acid is glycine.

24. The high flux membrane as set forth in claim 1 in which said aqueous solution contains a polyamine in a concentration in a range of from about 0.1% to about 20% by weight and said organic solvent solution contains a polyacyl halide in a concentration in the range of from about 0.01% to about 10% by weight.

25. The high flux membrane as set forth in claim 1 further characterized in that said aqueous solution contains an optional acid acceptor.

26. The high flux membrane as set forth in claim 1 in which the aqueous solution has a pH in the range of from about 8 to about 14.

27. The high flux membrane as set forth in claim 1 further characterized in that said membrane is subjected to optional treatment with water.

28. A process for the preparation of a high flux semipermeable membrane which comprises coating a porous support backing material with an aqueous solution of an aromatic polyamine, removing excess solution, contacting the coated porous support backing material with an organic solvent solution of a polyacyl halide, polysulfonyl halide, or polyisocyanate to form a reaction product within and/or on the surface of said porous support backing material, treating resultant composite with a solution of an acid selected from the group consisting of hydroxypolycarboxylic acids, polyaminoalkylene polycarboxylic acids, sulfonic acids, amino acids, amino acid salts, polymeric acids, inorganic acids, and amine salts of acids, drying and recovering the resultant high flux semipermeable membrane.

29. The process as set forth in claim 28 further characterized in that said aqueous solution contains and acid acceptor and has a pH in the range of from about 8 to about 14.

30. The process as set forth in claim 28 further characterized in that said aqueous solution contains a polar aprotic solvent which is present in said solution in a range of from about 0.01% to about 75% by weight.

31. The process as set forth in claim 28 further characterized in that said aqueous solution contains a polyhydric compound.

32. The process as set forth in claim 28 in which said polyamine is present in said aqueous solution in a concentration in the range of from about 0.1% to about 20% by weight and said polyacyl halide is present in said organic solvent solution in a concentration in the range of from about 0.1% to about 10% by weight.

* * * * *